TELEMETERING SYSTEM

Filed June 22, 1960 2 Sheets-Sheet 1

INVENTOR
D. M. CHAPIN
BY E J Oluder
ATTORNEY

INVENTOR
D.M. CHAPIN
BY E.J. Oliver
ATTORNEY 3,072,894
Patented Jan. 8, 1963

3,072,894

TELEMETERING SYSTEM

Daryl M. Chapin, Basking Ridge, N.J., assignor to Bell Telephone Laboratories, Incorporated, New York, N.Y., a corporation of New York Filed June 22, 1960, Ser. No. 37,916
5 Claims. (Cl. 340—200)

This invention relates to telemetering systems and more particularly to systems for reading a meter from a remote station.

Various attempts have been made in the past to devise a system for reading utility meters at a telephone subscriber's premises from a telephone central office or other control point. In general, such arrangements provide for the translation of the meter-reading into an electrical signal and for the transmission of the signal over telephone lines. The potential advantages of such a system include both speed and economy. Additionally, such a system may serve as the core of a fully integrated meter-reading, recording and billing arrangement.

A number of prior art systems designed for the remote reading of utility meters have failed to provide the potential advantages noted. For example, those systems requiring direct electrical connections to conventional meters, particularly electric power meters, are generally unsuitable because of interference with the electrical circuit of the meters. A major change in the design of the meter or the installation of a different type of meter is required to solve the problem. Other systems employ direct mechanical connections which overload the meters at the cost of reduced meter accuracy and increased mechanical complexity. While this problem also may be solved by the employment of specifically designed meters, or modified conventional meters, the attendant increase in the cost of the installation appears to render such a solution unacceptable.

A general object of the invention, therefore, is to facilitate the remote reading of utility-type meters.

A further object is to enable the electrical reading of such meters without modifying the meters themselves.

A more specific object is to incorporate a meter-reading system into a telephone system with a minimum of additional equipment.

These and other objects of the invention are attained by a meter-reading system which includes a capacitive pick-up adapter mounted over the face of a conventional utility-type meter. An alternating current interrogating signal, controlled from a remote station over telephone lines, is applied to the adapter causing a responding signal to be returned to the remote location. The responding signal is indicative of the angular displacement or reading of the meter pointer. The adapter includes a plurality of pick-up segments which correspond to the normal indicating divisions on the meter face. The responding or return signal is obtained by a motor-driven scanner which senses the amplitude of the interrogating signal after it has been coupled to the pick-up segments.

A feature of the invention is that the adapter imposes virtually no load on the meter. A further feature is that no electrical connections to the meter itself are required.

In accordance with still another feature of the invention, the meter reading is obtained without disturbing the telephone subscriber and interference with normal use of the telephone facilities is restricted to a very brief meter-reading period.

The principles of the invention together with additional objects and features thereof will be fully apprehended when considered in connection with the following drawings, in which.

Figure 1:
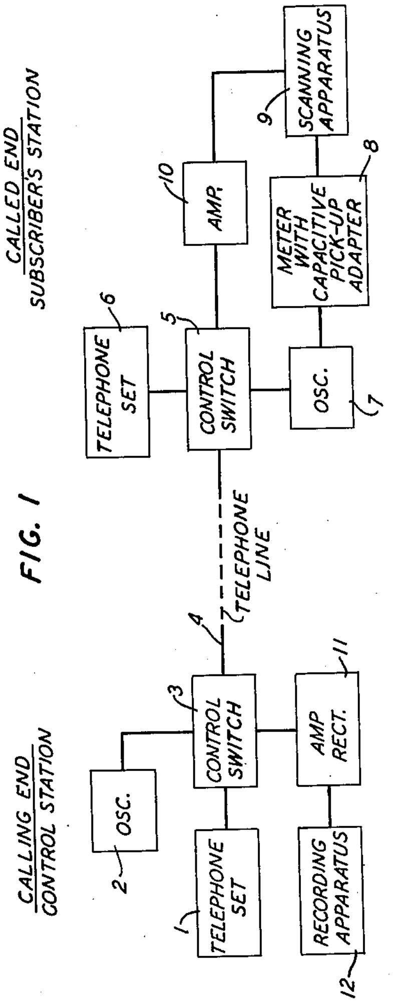
FIG. 1 is a block diagram of a telemetering system in accordance with the invention including equipment at both the remote and local station.

The block diagram shown in FIG. 1 illustrates the major units of equipment required to implement the principles of the invention in a system for obtaining the reading of an electric meter over a telephone line. Equipment shown at the calling end, which, for example, may be an electric utility office or other control station, includes a conventional subscriber's subset 1 which is employed in establishing a connection to the telephone subscriber's station or called end. After the connetcion to the called end is made, an oscillator 2 supplies a signal which initiates the operation of the called-end, meter-reading equipment. The amplifier rectifier 11 is employed to convert the responding or meter-reading signal from the called end into a suitable form for the operation of the recording apparatus 12. The control switch 3 effects a connection between the telephone line 4 and the subset 1, the oscillator 2, or the amplifier-rectifier 11.

At the called end, the equipment includes a subscriber's subset 6 which is not in operation during the meter-reading period. The interrogating signal is supplied by the oscillator 7 to the capacitive pick-up adapter 8, and the scanning apparatus 9 provides for sampling the output signals applied to terminals which correspond to the meter-reading divisions. These signals are amplified by the amplifier 10 and are applied to the telephone line 4.

The complete sequence of operations performed by the equipment shown in FIG. 1 is as follows. A normal telephone connection is established between the two stations, by way of a central office, not shown, by dialing from the control station subset 1. Immediately after dialing, the control switch 3 is operated to apply the output of the oscillator 2 to the telephone line 4. The control switch 5, in response to the signal from the oscillator 2, establishes what is in effect an off-hook condition when viewed from the interconnecting central office, not shown. Accordingly, ringing current is not applied. Additionally, operation of the control switch 5 applies conventional D.-C. supply voltage from the telephone line 4 to the oscillator 7, to the amplifier 10 and to the scanning apparatus 9. At this point, the control switch 3 is thrown to disconnect the oscillator 2 from the line and to connect the amplifier-rectifier 11 to the line in anticipation of the responding signal from the called end.

As noted above, the oscillator 7 generates an interrogating signal which is applied by means of capacitive pick-up to each of a plurality of output terminals. The structure of the adapter, described in detail below, is such that the amplitude of the signals appearing at the output terminals is a function of the reading of the meter. Sampling of the output or responding signals from the capacitive pick-up adapter 8 is effected by the scanning apparatus 9. The responding signals are then amplified by the amplifier 10 and through the control switch 5 are applied to the telephone line 4 for transmission, through the central office, not shown, to the calling end. The control switch 3 has been previously aligned as noted above to direct the incoming responding signals to the amplifier-rectifier 11 and the resulting output is fed to the recording apparatus 12. The recording apparatus may comprise a simple pen strip recorder or, alternatively, suitable automatic translating and billing equipment may be employed, analogous to the automatic message accounting systems known in the telephone art.

Figure 2:
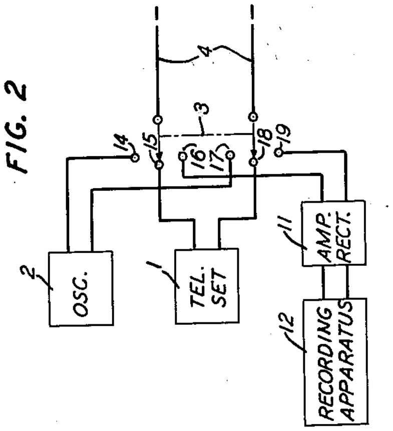
FIG. 2 is a schematic diagram of certain of the local station equipment shown in FIG. 1.

FIG. 2 shows the interconnections provided by the control switch 3 of FIG. 1. For simplicity of illustration, a manually operated double pole, triple-throw switch 3 is employed, although it will be apparent to persons skilled in the art that suitably timed relays may readily be designed to connect the outgoing line at the proper time, and in the proper sequence to the telephone subset 1, to the oscillator 2, and to the amplifier-rectifier 11. The switch 3 is shown in the position for normal telephone operation, connecting the subset terminals 15 and 18 to the outgoing line 4. As indicated above, connection to the called end is effected in conventional fashion by dialing through a central office, not shown.

Immediately after dialing, the switch 3 is thrown to the terminals 14 and 17 of the oscillator 2. The oscillator 2, shown again in block form, may comprise any suitable conventional device, such as a single transistor oscillator, with one or more stages of amplification, which is energized by the D.-C. supply voltage on the telephone line 4 from the central office, not shown. The frequency of the oscillator 2 is preferably in the voice frequency range and should be selected to avoid interference with other supervisory signals. In one embodiment of the invention, for example, a frequency of 2000 cycles was found to be satisfactory.

The function of the 2000 cycle signal is best described by reference to FIG. 3 which is a schematic wiring diagram of the apparatus shown in block form at the called end in FIG. 1. The control switch 5 of FIG. 1 includes the winding of the relay P which is connected across the line 4 in series with capacitor C3 and coil 26 which are series resonant at the frequency of the incoming 2000 cycle signal. At other frequencies, a substantially open circuit exists so that the relay is effectively isolated from the line. At the signaling frequency, however, the 2000 cycle current is rectified by diodes D3 and D4 and the relay operates closing the make contacts P1.

Assuming that the polarity of the line voltage is positive at the anode terminal of diode D5 with respect to the cathode side of the line, the closing of contacts P1 completes a direct current path across the line through diode D5 and the current limiting resistor R1 and line current flows in the loop to the central office, not shown. In conventional telephone practice the same condition, i.e., the initiation of line current, results from the operation of the called party's off-hook switch and, accordingly, from the central office end of the connection it appears that the subscriber's off-hook switch has in fact been operated. Consequently, just as in the case of an actual off-hook condition, ringing current is not applied to the line and a through connection is established for meter-reading purposes without disturbing the telephone subscriber. The specific means by which direct current flow on the line, as indicated, is employed at the central office to interupt or prevent the transmission of ringing current is well known in the telephone art and is therefore not shown.

At this point in the sequence of operations the incoming 2000 cycle signal from the calling end is terminated by shifting the control switch 3 (FIG. 2) to contacts 16 and 19 in anticipation of a responding signal. The relay P remains operated, however, by virtue of holding current in the path which includes diode D5, resistor R1, make contact P1, resistor R2, relay winding P and diode D3.

Certain telephone central office installations, specifically step-by-step systems serving private branch exchanges for example, reverse the polarity of the line voltage in response to an off-hook signal from the subscriber. FIG. 3 shows means for keeping the relay P in an operated or hold condition in a system of that type. Specifically, when polarity reversal occurs, the diode D5 is reverse-biased and a holding current path is established which includes diode D6, current-limiting resistors R3 and R4, make contacts P1, diode D4 and the winding of the relay P.

Upon the occurrence of the polarity reversal described, line voltage is immediately made available to the other major units of equipment in the system which include the oscillator 7, the motor 46 of the scanning system and the output amplifier comprising transistors T3 and T4.

Specifically, power to the oscillator 7 is supplied over leads 27 and 28. The oscillator 7 is conventional and comprises transistor T1 with collector and base circuits regeneratively coupled by transformer windings 19 and 20. Resistors R5, R6, and R7 establish the proper biasing potentials for the emitter, base, and collector, respectively, of transistor T1. Capacitor C13 is employed, conventionally, as a by-pass for the emitter biasing resistor R5 and capacitor C1 isolates the collector-biasing circuit from the base-emitter biasing circuit. Capacitor C2 is selected to fix the resonant frequency of the regenerative circuit at the desired oscillator frequency. In one embodiment this frequency was 2300 cycles. Inductor 42 is employed to couple the interrogating signal from the oscillator 7 to the shielded conductor 44 which in turn applies the 2300 cycle signal to the utility meter adapter 31.

Figure 4:
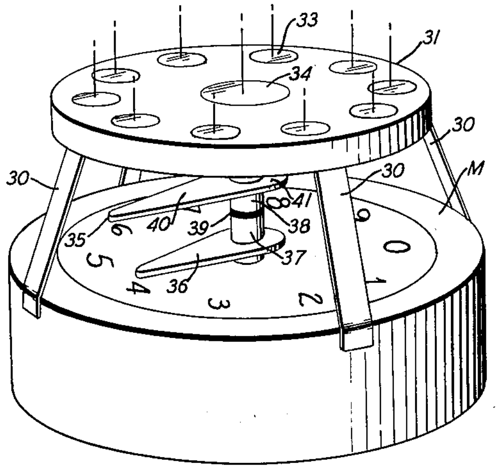
FIG. 4 is a perspective view of the meter adapter equipment mounted on a conventional electric power meter.
Figure 5:
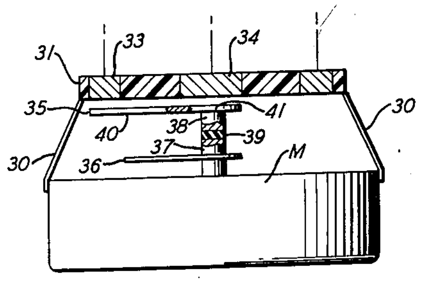
FIG. 5 is a cross section view of a meter adapter.

At this point, consideration of certain of the features shown in FIGS. 4 and 5 will serve as a useful preface to a discussion of the utilization of the output of the interrogating oscillator 7. FIGS. 4 and 5 show a meter M having a single dial with numerals 0 through 9 inscribed thereon as meter-reading designations. The meter pointer 36 is mounted on a shaft 37. An auxiliary pointer 40, having a pivot end 41 and a free end 35, is mounted on an extension 38 of the meter pointer shaft 37. The shaft extension 38 is electrically isolated from the shaft 37 by the insulating section 39. Mounted above the meter M and held in juxtaposed spaced relation by the supporting brackets 30 is the meter adapter 31, which may be fabricated from an insulating material such as polyethylene, for example. A total of ten conductive pick-up buttons, such as 33, are positioned in the adapter 31 around its periphery and a receiving button 34 is positioned in the center of the adapter 31. Each of the conductive buttons 33 and 34 is in relatively close spaced relation to the conductive auxiliary pointer 40 and a plurality of capacitive elements are formed thereby. Specifically, one capacitor comprises the receiving button 34 and the pivot end 41 of the auxiliary pointer 40. Additionally, a plurality of capacitors is formed by the free end 35 of the auxiliary pointer 40 and the pick-up buttons 33 which are closely adjacent thereto. The particular capacitance of each of the capacitors in this plurality is of course determined by the angular position, or the "reading," of the auxiliary pointer 40.

Figure 3:
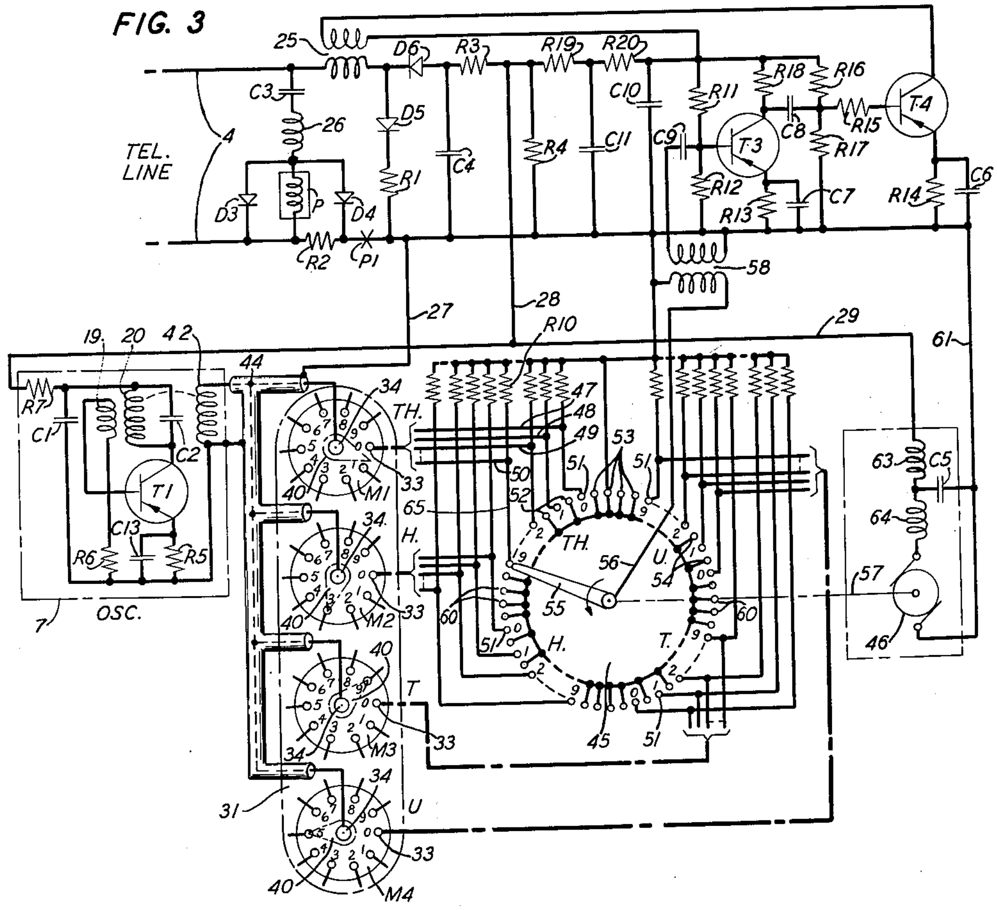
FIG. 3 is a schematic wiring diagram of certain of the remote station equipment shown in FIG. 1.

The apparatus shown in FIG. 3 may now be discussed in more detail. The electric utility meter comprises a total of four meter elements M1, M2, M3, and M4, each comprising a meter structure such as M, as shown in FIGS. 4 and 5. Like designating characters have been employed to indicate correspondence between various elements shown in FIG. 3 and in FIGS. 4 and 5. In FIG. 3 the adapter 31 is a unitary structure which includes positioning apertures for each of the forty pick-up buttons 33 and the four receiving buttons 34. The employment of four indicating dials to indicate the reading of a single meter is of course common in utility meters, an electric power meter being illustrative thereof. As indicated, dials M1 through M4 are designed to indicate thousands, hundreds, tens, and units of measuring increments which may be kilowatt-hours, for example.

As noted in the discussion of FIGS. 4 and 5, each of the receiving buttons 34 together with a respective pivot end 41 of an auxiliary pointer 40 forms a capacitor and hence the 2300 cycle interrogating signal that is applied to each receiving button 34 by way of the shielded cable 44 is capacitively coupled to a corresponding one of the auxiliary pointers 40. In the same fashion the signal is coupled from the free end 35 of each auxiliary pointer 40 to respective ones of the pick-up buttons 33. The actual number of pick-up buttons 33 to which a signal is applied will of course depend upon the particular space relation, configuration, and size of the auxiliary pointers 40 and of the pick-up buttons 33. In a typical case, a relatively large signal is applied to that pick-up button which is closest to its respective pointer. Smaller signals appear on adjacent pick-up buttons and still smaller signals on buttons further removed. It is obvious, however, that the amplitude of each signal appearing on a conductive pick-up button bears a direct and determinable relation to the distance between the button and its associated auxiliary pointer. Each pick-up button 33 is positioned to correspond to a particular meter-reading indication and consequently the relative amplitude of the signals appearing at the pick-up buttons may readily be interpreted to determine a meter reading. The interpretation of a specific illustrative set of meter-reading or responding signals is discussed below in connection with FIG. 6.

The remainder of the apparatus shown in FIG. 3 comprises a rotary switch 45, driven by a motor 46, which samples the responding signals applied to the pick-up buttons 33. The sampled signals are applied to the subscriber's telephone line 4 by way of a two-stage transistor-amplifier comprising transistors T3 and T4. In more detail, each of the forty pick-up buttons, such as 33, is connected to a corresponding contact such as 51 on the rotary switch 45 by a suitable connecting lead. For simplicity of illustration, only four of such leads in each of the four decade groups is shown, for example leads 47, 48, 49, and 50. Alternate switch contacts such as 52 and 54 are grounded to give a zero reading between every two adjacent signals. The four decades are arranged in sequence with additional grounded contacts such as 60 between adjacent decades. Between the end of the units decade U and the start of the thousands decade TH the number of grounded contacts 53 is increased to identify the start of the reading.

The rotating arm 55 of the switch 45 is driven by the motor 46 through the mechanical coupling 57. Operating voltage for the motor 46 is the line voltage from the central office, not shown. The motor 46 is connected across the line by leads 28, 29, and 61. The filter circuit comprising inductors 63 and 64 and capacitor C5 protect the transistor-amplifier circuit from the electrical noise of the motor 46. Each responding signal sampled by the rotating switch 45 is applied across the primary of a transformer 58 by way of the common lead 56 and by a respective one of the individual contact leads such as 65 which includes a load resistor such as R10. The secondary of the transformer 58 applies the responding signal to the base of the first-stage transistor T3 by way of the coupling capacitor C9. Biasing potential for the base of transistor T3 is fixed by resistors R11 and R12. Collector and emitter bias is controlled by resistors R18 and R13, respectively, and capacitor C7 is employed conventionally as a by-pass for resistor R13. Resistors R19 and R20 and capacitors C10 and C11 comprise a power supply filter circuit for the amplifier.

The output from the collector of transistor T3 is coupled to the base of the second stage transistor T4 by capacitor C8 and resistor R15. Resistors R15, R16 and R17 fix the biasing potential at the base of transistor T4, and resistor R14, by-passed by capacitor C6, fixes the emitter bias. The output of the second-stage transistor T4 is coupled from the collector to the subscriber's line 4 by the transformer 25 for transmission to the calling end of the line by way of the central office, not shown.

Apparatus for additional amplification, rectification, and final utilization of the responding signals is shown in block form in FIG. 2. It will be recalled that the switch 3 was shifted to contacts 16 and 19 thereby placing the amplifier-rectifier 11 across the line. This unit may be of conventional design and may, for example, comprise a single stage transistor-amplifier, diode-rectifier combination. The output from the amplifier-rectifier 11 is applied to the recording apparatus 12 which may comprise any suitable equipment designed to translate the incoming responding signals into some form of meter-reading record. Illustrative of such equipment is a conventional strip recorder in which the incoming signals are employed to control the movements of a recording stylus or pen on a recording sheet which is advanced at a uniform rate.

Figure 6:
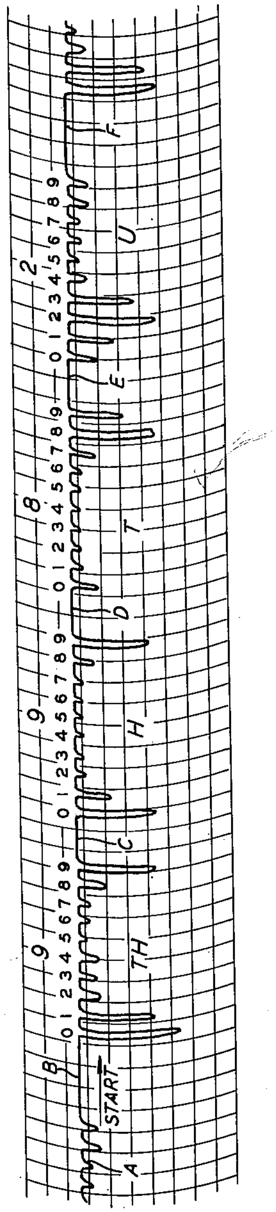
FIG. 6 is the trace of a recorder made in response to a meter-reading or responding signal derived in accordance with the invention.

FIG. 6 shows an illustrative trace made by a strip recorder in response to a set of meter-reading signals from an embodiment of the invention of the type described. In translating the trace into a meter-reading the initial or thousands digit TH is readily identified inasmuch as it is preceded by a long break space B which is indicative of the number of grounded contacts between the thousands decade and the units decade on the rotating switch 56 shown in FIG. 3. Accordingly, the initial part of the trace A at the far left may be disregarded. In the TH decade the two largest excursions of the trace, which correspond in relative magnitude and time to the incoming signals, occur at 9 and at 0. From the size of the trace at 1 it is evident that the reading is substantially closer to 0 than to 9. However, the same rules of interpretation apply as those employed when the dials are read visually. Specifically, if the pointer is between two numbers, the lower number is read, as the fractional value beyond the lower number is more accurately indicated by the next pointer. Accordingly, the proper reading for the TH decade is 9. The hundreds decade H, the units decade U, and the tens decade T are each preceded by a blank trace C, D, and E, respectively, which corresponds in length to the number of associated intervening grounded contacts on the scanning switch (FIG. 3). Translation to a numerical reading is performed in the manner indicated for the thousands decade TH and, as shown, the complete reading is 9982.

It is to be understood that the above-described arrangements are illustrative of the application of the principles of the invention. As indicated, more elaborate recording schemes than a strip recorder may be employed if an integrated automatic billing system is desired. Numerous other arrangements may be designed by those skilled in the art without departing from the spirit and scope of the invention.

What is claimed is:

1. Apparatus for adapting a meter having a dial-face and an indicating pointer therefor to a remote reading system comprising, in combination, an auxiliary pointer mounted in fixed, juxtaposed, spaced relation with respect to said indicating pointer, said auxiliary pointer being mechanically driven by said meter but electrically insulated therefrom, a conductive receiving button element in juxtaposed, spaced relation to the pivot end of said auxiliary pointer, a plurality of capacitive pick-up button elements evenly spaced in juxtaposed, spaced relation to the path of travel of the free end of said auxiliary pointer, means for applying an alternating current input signal to said receiving button element whereby said signal is applied by capacitive coupling to said auxiliary pointer and from said auxiliary pointer to a plurality of said pick-up buttons as an output signal, an integral insulating plate member for positioning said receiving button element and said capacitive pick-up buttons in a co-planar array, means for positioning said plate member in substantially parallel spaced relation to said dial-face and to said auxiliary pointer, a motor driven rotary switch having a plurality of terminals and a rotatable arm for making successive contacts with said terminals, means for applying said output signal from each of said receiving buttons to a corresponding one of said terminals, a transmission line, and means connecting said arm to said transmission line whereby, upon the operation of said rotary switch, successive ones of said output signals, indicative of the reading of said meter, may be applied to said transmission line for utilization at a distant point.

2. Apparatus for adapting a meter having a plurality of dial-faces and a corresponding plurality of indicating pointers therefor to a remote reading system comprising, in combination, a plurality of auxiliary pointers each mounted in fixed, juxtaposed, spaced relation with respect to a respective one of said indicating pointers, each of said auxiliary pointers being mechanically driven by said meter but electrically insulated therefrom, a plurality of conductive receiving button elements each in juxtaposed, spaced relation to the pivot end of a respective one of said auxiliary pointers, a plurality of groups of capacitive pick-up elements, each of said groups being evenly spaced in juxtaposed, spaced relation to the path of travel of the free end of a respective one of said auxiliary pointers, means for applying an alternating current input signal simultaneously to each of said receiving button elements, whereby said signal is applied by capacitive coupling to each of said auxiliary pointers and from each of said auxiliary pointers to a respective plurality of a respective group of said pick-up buttons as an output signal, the amplitude of said output signal at each of said last named pick-up buttons being indicative of the distance between the corresponding one of said auxiliary pointers and said last named button and hence indicative of the reading of said meter, an integral insulating plate member for positioning each of said receiving button elements and each of said groups of capacitive pick-up buttons in a co-planar array, means for positioning said plate member in substantially parallel spaced relation to said dial faces and to said auxiliary pointers, a motor driven rotary switch having a plurality of adjacent groups of terminals and a rotatable arm for making successive contacts with said terminals, each of said groups of terminals corresponding to a respective one of said groups of pick-up button elements, means for applying an output signal from each of said capacitive pick-up buttons to a respective one of said terminals, a transmission line, and means connecting said arm to said transmission line whereby, upon the operation of said rotary switch, successive groups of said output signals, indicative of the reading of said meter, may be applied to said transmission line for utilization at a distant point.

3. Apparatus for adapting a meter having a plurality of dial-faces and a corresponding plurality of indicating pointers therefor to a remote reading system comprising, in combination, a plurality of auxiliary pointers each mounted in fixed, juxtaposed, spaced relation with respect to a respective one of said indicating pointers, each of said auxiliary pointers being mechanically driven by said meter but electrically insulated therefrom, a plurality of conductive receiving button elements each in juxtaposed, spaced relation to the pivot end of a respective one of said auxiliary pointers, a plurality of groups of capacitive pick-up button elements, each of said groups being evenly spaced in juxtaposed, spaced relation to the path of travel of the free end of a respective one of said auxiliary pointers, means for applying an alternating current input signal simultaneously to each of said receiving button elements, whereby said signal is applied by capacitive coupling to each of said auxiliary pointers and from each of said auxiliary pointers to a respective plurality of a respective group of said pick-up buttons as an output signal, the amplitude of said output signal at each of said last named pick-up buttons being indicative of the distance between the corresponding one of said auxiliary pointers and said last named button and hence indicative of the reading of said meter, an integral insulating plate member for positioning each of said receiving button elements and each of said groups of capacitive pick-up buttons in a co-planar array, means for positioning said plate member in substantially parallel spaced relation to said dial-faces and to said auxiliary pointers, a rotary sampling switch having a rotatable contact arm and having a substantially circular array of terminals arranged in adjacent groups in a preassigned order corresponding to the digit order of a meter reading, each of said terminals in each of said last named groups being connected to a respective one of said pick-up buttons in a corresponding one of said groups of buttons, whereby, upon the rotation of said arm successive ones of said output signals translatable in terms of their relative amplitudes into a multidigit meter reading are applied to said arm, a transmission line, and means connecting said arm to said transmission line whereby, upon the operation of said rotary switch, successive groups of said output signals, indicative of the reading of said meter, may be applied to said transmission line for utilization at a distant point.

4. Apparatus in accordance with claim 3 wherein said rotary switch includes at least one auxiliary terminal between each of said groups of terminals and adjacent groups of said terminals and a unique plurality of said auxiliary terminals between that group of said terminals corresponding to the highest order digit of said meter reading and that group of said terminals corresponding to the lowest order digit of said meter reading and means for maintaining all of said auxiliary terminals at a common potential, whereby the correspondence between successive groups of said output signals and the meter-reading order of the digits represented thereby may be readily identified.

5. Apparatus for adapting a meter having a plurality of dial-faces and a corresponding plurality of indicating pointers therefor to a remote reading system comprising, in combination, a plurality of auxiliary pointers each mounted in fixed juxtaposed, spaced relation with respect to a respective one of said indicating pointers, each of said auxiliary pointers being mechanically driven by said meter but electrically insulated therefrom, a plurality of conductive receiving button elements each in juxtaposed spaced relation to the pivot end of a respective one of said auxiliary pointers, a plurality of groups of capacitive pick-up button elements, each of said groups being evenly spaced in juxtaposed, spaced relation to the path of travel of the free end of a respective one of said auxiliary pointers, means for applying an alternating current input signal simultaneously to each of said receiving button elements, whereby said signal is applied by means of capacitive coupling to each of said auxiliary pointers and thence from each of said auxiliary pointers to a respective plurality of a respective group of said pick-up buttons as output signals, the relative amplitude of said output signals being indicative of the reading of each of said indicating pointers, an integral insulating plate member having a plurality of groups of accommodating apertures for positioning said groups of pick-up buttons and a plurality of single apertures, each centered in a respective one of said groups of apertures for positioning a respective one of said receiving buttons, means positioning said plate in substantially parallel spaced relation to said dial-faces and to said auxiliary pointers such that said auxiliary pointers lie between said plate and said dial-faces, a motor driven rotary switch having a plurality of adjacent groups of terminals and a rotatable arm for making successive contacts with said terminals, means for applying an output signal from each of said capacitive pick-up buttons to a respective one of said terminals, a transmission line, means connecting said arm to said transmission line whereby, upon the operation of said rotary switch, successive groups of said output signals, indicative of the reading of said meter, may be applied to said transmission line for utilization at a distant point, and means for amplifying said signals prior to transmission to said distant point.

References Cited in the file of this patent

UNITED STATES PATENTS

| | | |
|---|---|---|
| 2,039,405 | Green | May 5, 1936 |
| 2,067,098 | Rogers | Jan. 5, 1937 |
| 2,402,603 | Clark | June 25, 1946 |

FOREIGN PATENTS

| | | |
|---|---|---|
| 984,927 | France | Mar. 7, 1951 |